(12) United States Patent
Yang et al.

(10) Patent No.: US 11,968,657 B2
(45) Date of Patent: Apr. 23, 2024

(54) SCHEDULING SERVING CELLS WITH SIGNALING MESSAGE

(71) Applicant: Nokia Technologies OY, Espoo (FI)

(72) Inventors: Tao Yang, Shanghai (CN); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 468 days.

(21) Appl. No.: 17/422,992

(22) PCT Filed: Jan. 15, 2019

(86) PCT No.: PCT/CN2019/071764
§ 371 (c)(1),
(2) Date: Jul. 14, 2021

(87) PCT Pub. No.: WO2020/147003
PCT Pub. Date: Jul. 23, 2020

(65) Prior Publication Data
US 2022/0078803 A1 Mar. 10, 2022

(51) Int. Cl.
*H04L 5/00* (2006.01)
*H04W 72/12* (2023.01)

(52) U.S. Cl.
CPC ........... *H04W 72/12* (2013.01); *H04L 5/0048* (2013.01)

(58) Field of Classification Search
CPC .............................. H04W 72/12; H04L 5/0048
(Continued)

(56) References Cited

U.S. PATENT DOCUMENTS

2016/0227541 A1 8/2016 Damnjanovic et al.
2018/0279289 A1 9/2018 Islam et al.
(Continued)

FOREIGN PATENT DOCUMENTS

CN 102577571 A 7/2012
CN 107210899 A 9/2017
(Continued)

OTHER PUBLICATIONS

CATT "Remaining Aspects of CA and Wider Bandwidth Operation" 3GPP TSG RAN WG1 Meeting NR#3, Agenda item 6.3.4, R1-1715830, Sep. 2017.
(Continued)

*Primary Examiner* — Gbemileke J Onamuti
(74) *Attorney, Agent, or Firm* — Harness, Dickey & Pierce, P.L.C.

(57) ABSTRACT

Example embodiments of the present disclosure relate to a device, method, apparatus and computer readable storage medium for scheduling serving cells with a signaling message. In example embodiments, a terminal device receives, in a Layer 1 (L1) signaling message, a resource indication to schedule resources on a plurality of bandwidth parts in a plurality of serving cells. The terminal device determines a reference size of a reference bandwidth part. The terminal device determines a reference resource based on the received resource indication and the reference size of the reference bandwidth part. The terminal device further determines alignment between the reference bandwidth part and a scheduled bandwidth part of the plurality of bandwidth parts. The terminal device determines, based on the reference resource and the alignment, a scheduled resource on the scheduled bandwidth part.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0343089 A1 | 11/2018 | Park et al. | |
| 2018/0343154 A1 | 11/2018 | Park et al. | |
| 2019/0149305 A1* | 5/2019 | Zhou .................... | H04L 5/0048 370/330 |

FOREIGN PATENT DOCUMENTS

| | | |
|---|---|---|
| CN | 107579809 A | 1/2018 |
| CN | 107708210 A | 2/2018 |
| CN | 108702752 A | 10/2018 |
| CN | 108934075 A | 12/2018 |
| CN | 108966181 A | 12/2018 |
| CN | 109076387 A | 12/2018 |
| CN | 109152023 A | 1/2019 |
| CN | 109152072 A | 1/2019 |
| EP | 3110195 A1 | 12/2016 |
| KR | 20180106869 A | 10/2018 |
| WO | WO-2015124084 A1 | 8/2015 |
| WO | WO-2018203717 A1 | 11/2018 |
| WO | WO-2018204630 A1 | 11/2018 |

OTHER PUBLICATIONS

3GPP TS 38.212, V15.4.0, Technical Specification, '3rd Generation Partnership Project; Technical Specification Group Radio Access Network; NR; Multiplexing and channel coding (Release 15)' Dec. 2018.

3GPP TS 38.214, V15.4.0, Technical Specification, '3rd Generation Partnership Project; Technical Specification Group Radio Access Network; NR; Physical layer procedures for data (Release 15)' Dec. 2018.

International Search Report PCT/ISA/210 for International Application No. PCT/CN2019/071764 dated Sep. 27, 2019.

Chinese Office Action, dated Sep. 28, 2023, issued in corresponding Chinese Patent Application No. 201980089067.8.

3GPP TSG RAN WG1 Meeting #93 R1-1806775, "Remaining Details on Bandwidth Part Operation in NR", Busan, Korea, May 21-May 25, 2018.

3GPP TSG RAN WG1 NR Meeting# 90 R1-1713654, "Wider Bandwidth Operations", Prague, Czech Republic, Aug. 21-26, 2017.

3GPP TSG-RAN WG2 Meeting #101 R2-1803768, Clarification for initial BWP ID configuration for DCI indication (RIL Q319 Q320), Athens, Greece, Feb. 26-Mar. 2, 2018.

Office Action for Indian Application No. 202147036222 dated Mar. 7, 2022.

SAMSUNG: "Wider Bandwidth Operations", 3GPP Draft; R1-1713654, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; Aug. 21, 2017-Aug. 26, 2017 Aug. 20, 2017 (Aug. 20, 2017), pp. 1-9, XP051316454, Retrieved from the Internet: URL:http://www.3gpp.org/ftp/Meetings_3GPP SYNC/RAN1/Docs/ [retrieved on Aug. 20, 2017].

Search Report for European Application No. 19909679.3 dated Jul. 25, 2022.

\* cited by examiner

SCHEDULING SERVING CELLS WITH SIGNALING MESSAGE

CROSS-REFERENCE TO RELATED APPLICATIONS

This application is a national phase under 35 U.S.C. § 371 of PCT International Application No. PCT/CN2019/071764 which has an International filing date of Jan. 15, 2019, the entire contents of each of which are hereby incorporated by reference.

FIELD

Example embodiments of the present disclosure generally relate to the field of communications, and in particular, to a device, method, apparatus and computer readable storage medium for scheduling serving cells with a signaling message.

BACKGROUND

It is approved to enhance carrier aggregation (CA) and Dual Connectivity (DC) functionality of New Radio (NR). One of important objectives is to minimize L1 signaling overhead for more efficient and low-latency serving cell configuration, scheduling and data transmission. For example, the signaling overhead and latency may be minimized for initial cell setup, additional cell setup and additional cell activation for data transmission. This objective is applied in various scenarios of Multi-RAT (Radio Access Technology, or MR) DC, NR-NR DC, CA and the like. The enhancements may be achieved in IDLE, INACTIVE and CONNECTED modes.

In a legacy system, signal dedicated control information (DCI) is used to schedule only one serving cell. Accordingly, in a multiple serving cell scheduling scenario, especially in CA scenario, multiple downlink (DL) scheduling DCIs will be transmitted, which leads to huge amount of L1 signaling overhead.

SUMMARY

In general, example embodiments of the present disclosure provide a device, method, apparatus and computer readable storage medium for scheduling serving cells with a signaling message.

In a first aspect, a device is provided which comprises at least one processor; and at least one memory including computer program code. The at least one memory and the computer program code are configured to, with the at least one processor, cause the device to receive, by a terminal device in a Layer 1 signaling message, a resource indication to schedule resources on a plurality of bandwidth parts in a plurality of serving cells. The device is further caused to determine a reference size of a reference bandwidth part. The device is caused to determine a reference resource based on the received resource indication and the reference size of the reference bandwidth part. Then, the device is caused to determine alignment between the reference bandwidth part and a scheduled bandwidth part of the plurality of bandwidth parts. The device is further caused to determine, based on the reference resource and the alignment, a scheduled resource on the scheduled bandwidth part.

In a second aspect, a method is provided. In the method, a terminal device receives, in a Layer 1 signaling message, a resource indication to schedule resources on a plurality of bandwidth parts in a plurality of serving cells. The terminal device determines a reference size of a reference bandwidth part. The terminal device determines a reference resource based on the received resource indication and the reference size of the reference bandwidth part. The terminal device further determines alignment between a reference bandwidth part and a scheduled bandwidth part of the plurality of bandwidth parts. The terminal device further determines, based on the reference resource and the alignment, a scheduled resource on the scheduled bandwidth part.

In a third aspect, there is provided an apparatus comprising means for performing the method according to the second aspect.

In a fourth aspect, there is provided a computer readable storage medium that stores a computer program thereon. The computer program, when executed by a processor of a device, causes the device to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device capable of providing services to a terminal device in a communication network. The network device may include an access network device via which the terminal device can access the communication network. Examples of the access network device include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

The network device may also include a core network device capable of communicating with the access network device and providing services to the terminal device in a core network. As an example, the core network device may include Mobile Switching Centers (MSCs), MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, user equipment (UE) such as smart phones, wireless-enabled tablet computers, laptop-embedded equipment (LEE), laptop-mounted equipment (LME), any wireless-enabled devices, any industry sensors/machines/robotics, and/or wireless customer-premises equipment (CPE). For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

Many items have been proposed to enhance the CA and DC functionality of NR. Example items are illustrated as below:
  L1 downlink control overhead reduction for intra-band and inter-band NR CA
    Single DCI to schedule a UE over multiple DL component carriers
    Enhanced support of NR DL and NR Uplink (UL), including Supplementary UL (SUL), deployments in different frequency ranges
      Multiple Hybrid Automatic Repeat request-Acknowledgement (HARQ-ACK) reporting transmissions by a UE within a slot in a Physical Uplink Control Channel (PUCCH) group
      Enhanced pathloss estimation for UL power control on SUL for the case of non-collocated deployment of NR DL and NR UL
  BWP enhancements to support multiple numerologies for a UE within a carrier
    Multiple active BWPs for a UE within a carrier
    Faster BWP switching times As described above, to reduce the L1 signaling overhead for more efficient DL data transmission, a high-level mechanism is to schedule multiple DL carriers with a single DCI. Conventionally, a signal DCI is used to schedule only one serving cell. For multiple serving cell scheduling, multiple DL scheduling DCIs need be transmitted, which leads to huge amount of L1 signaling overhead. If a single DL DCI can be shared among multiple serving cells, L1 overhead may be significantly saved for scheduling DCI. Such mechanism shall be applicable in both of the intra-band and inter-band CA scenarios. However, there is no a functional and efficient approach to enable the mechanism.

Regarding the L1 DL scheduling DCI, multiple information elements (IEs) are included to provide a UE with necessary information to decode physical UL/DL data shared channel (PxSCH). One key information element (IE)

is related to assigned frequency domain radio resource elements, which is known as a RA (Resource Assignment) IE. There are two types of RA IE definition: bit-map based definition (TYPE 0 RA) and a starting physical resource block (PRB) (PRB_Start)/the number of PRB (PRB_N) pair-based definition (TYPE 1 RA). In TYPE 1 RA, the parameter PRB_Start indicates a starting PRB index of the assigned radio resource, and the parameter PRB_N is the contiguous assigned PRB number. These two parameters will identify the allocated radio resource.

If a single L1 DL DCI is used to schedule multiple serving cells, a single IE in the DCI will be applied to the multiple serving cells. In this situation, there are some potential problems, for example, (i) how to interpret such IE in multiple serving cells of diverse configurations and (ii) how to ensure sufficient scheduling flexibility at the gNB. Therefore, a smart signaling solution needs to be designed.

Example IEs are shown in Table 1 below for NR R15 DCI Format 1_0, as an example:

TABLE 1

| Field (Item) | Bits | Reference |
| --- | --- | --- |
| Identifier for DCI formats | 1 | Always set to 1, meaning this is for DL |
| Frequency domain resource assignment | Variable | Variable with DL_BWP_N_RB |
| Time domain resource assignment | X | Carries the row index of the items in pdsch_allocationList in RRC |
| VRB-to-PRB mapping | 1 | According to 38.212 Table 7.3.1.1.2-33<br>0 : Non-Interleaved<br>1 : Inverleaved |
| Modulation and coding scheme | 5 | 38.214 - Table 5.1.3.1-1: MCS index table 1 for PDSCH<br>38.214 - Table 5.1.3.1-2: MCS index table 2 for PDSCH |
| New data indicator | 1 | |
| Redundancy version | 2 | |
| HARQ process number | 4 | |
| Downlink assignment index | 2 | |
| TPC command for scheduled PUCCH | 2 | |
| PUCCH resource indicator | 3 | |
| PDSCH-to-HARQ_feedback timing indicator | 3 | Row number(index) of K1 |

To guarantee correct data decoding at UE side, one of the key tasks is to correctly decode and interpret the "Frequency domain resource assignment" field (FD-RA IE: resource allocation" IE) as shown in Table 1. The target is to identify the assigned frequency domain resource of the corresponding bandwidth part (BWP) used for data transmission, so that a physical UL/DL data shared channel (PxSCH) can be received and decoded correctly.

In legacy systems, such as NR R15, one DCI schedules one active BWP in one serving cell. There is no scheme of how to support scheduling FD-RA of multiple serving cells using a single DCI, when multiple PxSCHs are scheduled on multiple active serving cells and the corresponding active BWPs use different configurations. A straightforward design may be reserve one IE field in a DCI for each serving cell. However, this will prohibitively increase DL control overhead.

It can be noticed that if one RA IE can be leveraged to schedule multiple PxSCH on more than one active serving cells or BWPs, a single DCI can be used to schedule multiple serving cells. The inventors further notice that the challenge is how to interpret the single RA (for example, RA TYPE 1) in multiple BWPs which can be of different sizes and numerology.

Example embodiments of the present disclosure provide a scheme of schedule resources on a plurality of bandwidth parts in a plurality of serving cells using a signal resource indication in a L1 signaling message. With this scheme, after the resource indication is received at a terminal device in the L1 signaling message. The terminal device determines a reference size of a reference BWP and determines a reference resource t based on the received resource indication and the reference size. The terminal device also determines alignment between a reference bandwidth part and a scheduled bandwidth part of the plurality of bandwidth parts. Further, the terminal device determines a scheduled resource on the scheduled bandwidth part based on the reference resource and the alignment.

In this way, a single RA IE field in a DCI may be applied to all serving cells scheduled by the DCI, given predefined rules. For example, the RA IE may be interpreted based on the reference size of a reference BWP and the predefined rules. In TYPE 1 RA, the parameters PRB_Start and PRB_N are explicitly indicated. Accordingly, reference PRB_Start and PRB_N for the reference resource may be determined by this interpretation of the RA IE. In TYPE 0 RA, the terminal device may first interpret the RA IE according to corresponding BWP PRB configuration, and obtain the two parameters PRB_Start and PRB_N to identify the assigned frequency domain resource for data decoding. Base on the obtained PRB_Start and PRB_N, the reference PRB_Start and PRB_N may also be determined.

Further, resource allocation for the PxSCH may be provided on the multiple cells, taking into account different configurations among all scheduled BWPs of multiple cells. As such, a single FD-RA IE field can be interpreted to provide resource-allocation for PxSCH on the multiple cells, taking into account different configurations among all scheduled BWPs of multiple cells.

Figure 1:
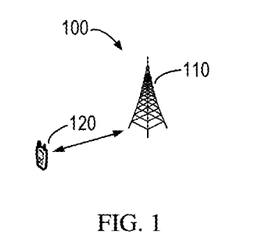
FIG. 1 illustrates an example environment in which example embodiments of the present disclosure can be implemented.

FIG. 1 shows an example environment 100 in which example embodiments of the present disclosure can be implemented. The environment 100, which may be a part of a communication network, comprises a network device 110 and a terminal device 120. It is to be understood that one network device 110 and one terminal device 120 shown in the environment 100 is only for the purpose of illustration, without suggesting any limitation to the scope of the present disclosure. The environment 100 may include any suitable number of network devices and terminal devices adapted for implementing example embodiments of the present disclosure.

The terminal device 120 can communicate with the network device 110 or with another terminal device (not shown) directly or via the network device 110. The communication may follow any suitable communication standards or protocols such as Universal Mobile Telecommunications System (UMTS), long term evolution (LTE), LTE-Advanced (LTE-A), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC) and ultra-reliable low latency communication (URLLC) technologies.

In the environment 100, the network device 110 by itself or together with other network devices (not shown) can provide a plurality of serving cells. In the CA scenario, different serving cells may operate on different carriers. These serving cells may be available to the terminal device 120 for communication.

The terminal device 120 can transmit or receive data on a plurality of BWPs in a plurality of serving cells. In various example embodiments of the present disclosure, the plurality of BWPs of the serving cells are scheduled by a single L1 signaling message such as DCI. For example, after the terminal device 120 receives a resource indication (for example, RA IE) in the L1 signaling message, the terminal device 120 interprets the resource indication based on a predefined rule to identify these BWPs of the plurality of serving cells.

Figure 2:
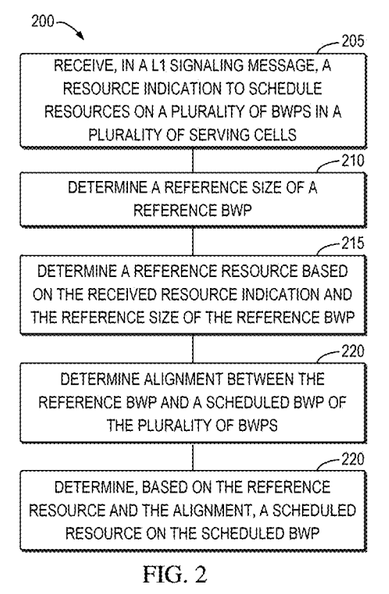
FIG. 2 illustrates a flowchart of an example method in accordance with some example embodiments of the present disclosure.

FIG. 2 illustrates a flowchart of an example method 200 in accordance with some example embodiments of the present disclosure. The method 200 can be implemented by the terminal device 120 as shown in FIG. 1. For the purpose of discussion, the method 200 will be described with reference to FIG. 1.

At block 205, the terminal device 120 receives a resource indication in a L1 signaling message to schedule resources on a plurality of BWPs in a plurality of serving cells. The L1 signaling message may be implemented by DCI, and the resource indication may be implemented by RA IE content or a resource indication value (RIV) sent in DCI. The RIV may be used to schedule PxSCHs on multiple active BWPs in multiple active serving cells. It is to be understood that other implementations of the L1 signaling message and the resource indication may be possible.

In some example embodiments, the terminal device may first determine the RA IE size to avoid blind decoding (BD) of a DCI format size. The RA IE size may be tightly related to the corresponding BWP size (for example, in PRBs) indicated by the RA IE.

At block 210, the terminal device 120 determines a reference size of a reference BWP. The reference size of the reference BWP may be preconfigured by the network device 110 using a higher layer signaling message, such as Radio Resource Control (RRC) signaling. Alternatively, the reference size of the reference BWP may be dynamically configured by the network device 110 using the higher layer signaling message for this scheduling. In this case, the reference size is configured per scheduling instance.

At block 215, based on the received resource indication and the reference size, the terminal device 120 determines a reference resource. The determination of the reference resource may be implemented based on any suitable rules or criterion.

In some example embodiments, scaling operation may be applied in the determination to match different sizes of the scheduled BWPs in different serving cells. For example, the terminal device 120 may calculate the starting PRB (PRB_Start) and continuous assigned PRB number (PRB_N) of the reference resource based on the pre-determined reference BWP and the RA IE content, optionally by applying scaling with a scaling factor. The scaling factor may be an integer or fraction. The applying of the scaling operation may be related to the reference size of the reference BWP and the size of the scheduled BWP.

At block 220, the terminal device 120 determines alignment between a reference BWP and a scheduled BWP of the plurality of BWPs. For example, the alignment can be achieved by aligning an alignment point of the scheduled bandwidth part with an alignment point of the reference bandwidth part. At block 225, the terminal device 120 determines a scheduled resource on the scheduled BWP based on the reference resource and the alignment. For example, after the parameters PRB_Start and PRB_N are calculated, these two parameters may be applied to all scheduled serving cells by the alignment for DL data reception according to predefined rules, to determine the scheduled resource.

Example processes of determining the reference resource and the scheduled resource will be described below with reference to FIGS. 3 and 4.

Figure 3:
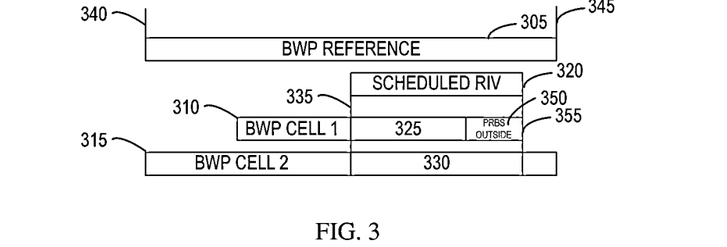
FIG. 3 illustrates example determination of multiple scheduled BWPs in multiple cells in accordance with some example embodiments of the present disclosure.

FIG. 3 shows example determination of multiple scheduled BWPs in multiple cells in accordance with some example embodiments of the present disclosure.

In this example, a reference BWP 305 is larger than scheduled BWPs 310 and 315 of two cells (for example, Cell 1 and Cell 2). The RIV is interpreted using the reference BWP 305 to obtain a reference resource 320. In this case, no scaling is required for the reference BWP 305. Alternatively, the network device 110 may configure the scaling operation so that the PRB_Start and PRB_N of the reference resource 320 may be scaled down to match the smaller scheduled BWPs (for example, the scheduled BWP 310), according to different scaling factor configuration. The scaling operation can be configured and controlled by the network device 110 through high layer signaling (for example, the RRC signaling) in advance. The scaling factor may pre-configured per scheduled BWP based on the comparison of the reference size of the reference BWP and the size of scheduled BWP.

The terminal device 120 determines scheduled resources 325 and 330 based on the reference resource 320. In this example, the alignment operation may be applied to guarantee the alignment of the scheduled BWP PRBs. The alignment may be implemented based on an alignment point 335 which is a center PRB of the reference and scheduled BWPs, for example. It may be possible that the alignment point 430 is a center sub-carrier or PRB of the BWPs. Other alignment points are also possible, such as a starting PRB 340 or an end PRB 345 of the BWPs. The alignment point 335 may be pre-configured by the network device 110 per scheduled BWP. Accordingly, the terminal device 120 knows how to align the scheduled resource to the actual scheduled BWP PRB number.

In the alignment operation, a truncated operation may be applied. As shown in FIG. 3, for Cell 1, when the scheduled BWP 310 is aligned to the reference resource 320 with respect to the alignment point 335, the PRBs 350 are truncated from a candidate resource 355 so that the scheduled resource is within the scheduled bandwidth part. The centering alignment ensures that truncation occurs symmetrically on each side of the BWP.

Figure 4:
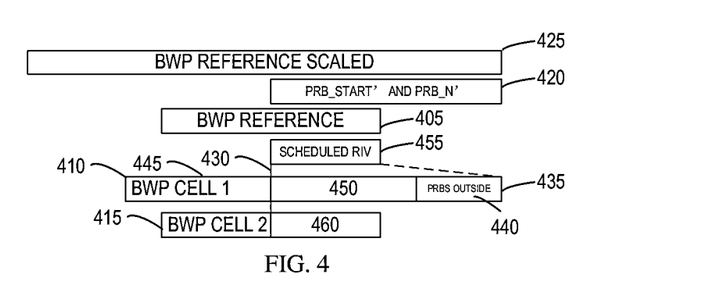
FIG. 4 illustrates example determination of multiple scheduled BWPs in multiple cells in accordance with some other example embodiments of the present disclosure.

FIG. 4 shows example determination of multiple scheduled BWPs in multiple cells in accordance with some other example embodiments of the present disclosure.

In this example, a reference BWP 405 is smaller than a scheduled BWP 410 in Cell 1 and equals to a scheduled BWP 415 in Cell 1. For Cell 1, the reference size of the reference BWP 405 may be first scaled by a scaling factor that is configured by the network device 110 in the high layer signaling or determined by the terminal device 120 as [scheduled BWP PRB number/reference BWP PRB number]. Then, a reference resource 420 indicated by PRB_Start' and PRB_N' is calculated based on a scaled reference BWP 425. For the scheduled BWP 410 in Cell 1, PRB #0 is at the beginning of the scaled reference BWP 425.

Then, as shown, the scheduled BWP 410 in Cell 1 is aligned with the reference resource 420 with respect to an alignment point 430 which is a center PRB of the reference BWP 405. A candidate resource 435 is determined on the scheduled BWP 410, and then a part 440 of the candidate resource 435 is truncated so that an unscheduled resource 445 and a scheduled resource 450 are symmetrical with respect to the alignment point 430.

For the scheduled BWP 415 in Cell 2, no scaling is performed. PRB #0 is at the beginning of the reference BWP 405. By aligning with a reference resource 455, a scheduled resource 460 is determined on the scheduled BWP 415.

If single-cell scheduling and multi-cell scheduling coexist for a serving cell, the alignment of resource block group (RBG) gird of the scheduled BWP with the reference BWP may ensure that the scheduled BWP is also aligned with the RBG grid of the associated cell.

With the scaling and truncating operations, these two parameters PRB_Start and PRB_N obtained by interpreting the RIV may be modified based on an actual size of a scheduled BWP from the plurality of BWPs. The scaling and truncating operations are compatible to R15. In addition, the whole bandwidth of the scheduled BWP may be utilized to improve UE peak data rate by configuring or defining different scaling factors.

Figure 5:
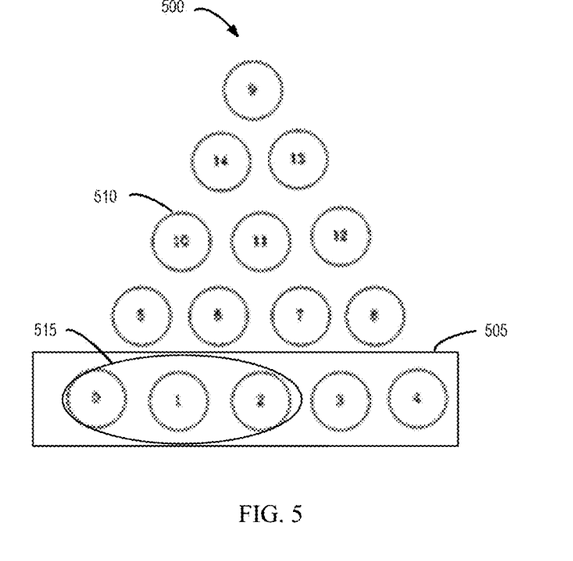
FIG. 5 illustrates an example structure of a resource allocation tree in accordance with some example embodiments of the present disclosure.

In some other example embodiments, the determinations of the scheduled resource may be based on a reference resource allocation tree which organizes values of the resource indications in a tree-shape which is shown in FIG. 5, for example.

In a reference resource allocation tree 500 as shown in FIG. 5, each node is associated or labeled with a value of a resource indication (for example, a RIV). Leaf nodes 505 of the reference resource allocation tree 500 may indicate the scheduled resource (for example, allocated PRBs) on the scheduled BWP. In this example, the size of the scheduled BWP is 5 PRBs. As an example, for a node 510 labeled with RIV=10, leaf nodes 515 indicates that PRB #0, PRB #1 and PRB #2 are allocated on the scheduled BWP.

Using the rules defined based on the "RIV tree", the terminal device 120 may directly apply the RA IE content to each of scheduled active serving cells, to calculate PRB_Start and PRB_N per scheduled BWP. For example, the RIV may be modified based on an actual size of a scheduled BWP from the plurality of BWPs and PRB_Start, and PRB_length may be determined based on the size of the scheduled BWP.

Figure 6:
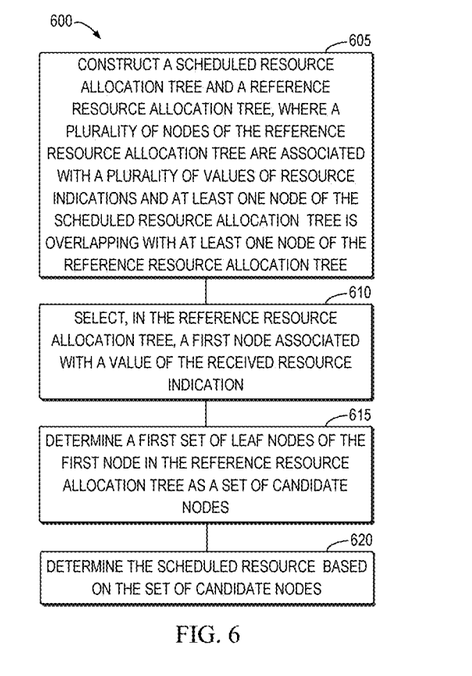
FIG. 6 illustrates a flowchart of an example process in accordance with some other example embodiments of the present disclosure.

FIG. 6 shows an example process 600 of determining the reference resource using the resource allocation tree in accordance with some example embodiments of the present disclosure.

As shown, at block 605, the terminal device 120 constructs a scheduled resource allocation tree and a reference resource allocation tree. In the reference resource allocation tree, a plurality of nodes are associated with a plurality of values of resource indications. Moreover, at least one node of the scheduled resource allocation tree is overlapping with at least one node of the reference resource allocation tree.

The resource allocation tree may be constructed in any suitable overlapping mode. For example, the nodes of the reference resource allocation tree are on the top, left or right or outside of the nodes of the scheduled resource allocation tree. Other overlapping patterns are also possible. In some example embodiments, the overlapping pattern may be related to comparison of the reference size of a reference BWP and the size of the scheduled BWP. For example, if the reference size is less than the size of the scheduled BWP, the nodes in the reference resource allocation tree are on the top or left of the nodes in the scheduled resource allocation tree. If the reference size is greater than the size of the scheduled BWP, the nodes in the reference resource allocation tree are on the outside or right of the nodes in the scheduled resource allocation tree.

Different overlapping patterns of the resource allocation trees may be configured by the network device 110 using high layer signaling. In this case, the terminal device 120 may receive, from the network device 110, an indication of the overlapping pattern of the resource allocation trees in a higher layer signaling message, and determine the overlapping pattern of the resource allocation trees based on the indication. Alternatively, the overlapping pattern of the resource allocation trees may be selected by the terminal device 120 from a set of predefined overlapping patterns which may be defined in the specification by the third generation Partnership Project (3GPP), for example.

At block 610, the terminal device 120 selects a node (referred to as "a first node") associated with a value of the received resource indication in the reference resource allocation tree. At block 615, the terminal device 120 determines a set (referred to as "a first set") of leaf nodes of the first node in the reference resource allocation tree as a set of candidate nodes. At block 620, the terminal device 120 determines the scheduled resource based on the set of candidate nodes.

In some example embodiments, the candidate nodes may be determined as scheduled nodes for indicating the scheduled resource. An example process will be discussed below with reference to FIG. 7.

Figure 7:
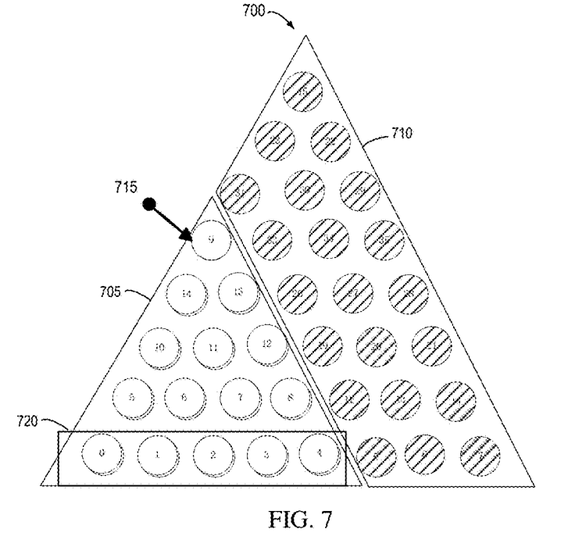
FIGS. 7-10 illustrates example structures of a resource allocation tree in accordance with some example embodiments of the present disclosure.

FIG. 7 shows an example overlapping pattern 700 of the resource allocation trees in accordance with some example embodiments of the present disclosure.

In this example, the reference size is less than the size of the scheduled BWP, and the nodes in a reference resource allocation tree 705 are on the left of the nodes in a scheduled resource allocation tree 710. A node 715 is selected in the reference resource allocation tree 705 based on the decoded RIV=9. The leaf nodes 720 of the node 715 are determined as the candidate nodes. In this example, these candidate nodes are determined as scheduled nodes. Accordingly, the terminal device 120 identifies PRB_Start=0 and PRB_N=4 on the scheduled BWP as the scheduled resource.

With the overlapping pattern 700, a UE may use a part of resources on a wider BWP, and therefore multi-user multiplex may be improved on the BWP. As such, the UE scheduling fairness may be improved because more UEs can be multiplexed in a frequency domain (FD).

In the example embodiments where the nodes in the reference resource allocation tree are on the top of the nodes of the scheduled resource allocation tree, the set of candidate nodes may be mapped into the bottom row of the scheduling resource allocation tree to determine the set of scheduled nodes. An example process will be discussed below with reference to FIG. 8.

Figure 8:
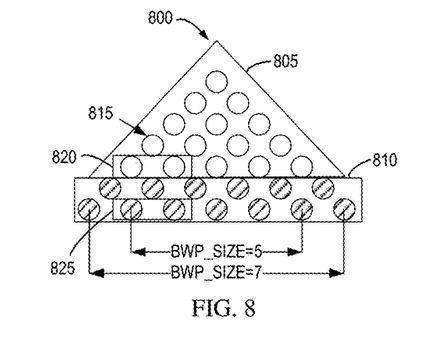

FIG. 8 shows an example overlapping pattern 800 of the resource allocation trees in accordance with some example embodiments of the present disclosure.

In this example, the reference size is less than the size of the scheduled BWP, and the nodes in a reference resource allocation tree 805 are on the top of a scheduled resource allocation tree 810. As shown, the reference BWP size is 5 PRB and the scheduled BWP size is 7 PRB. A node 815 is selected based the RIV indicated in the DCI in reference resource allocation tree 805. Then, a set of leaf nodes 820 is determined as the candidate nodes. These nodes 820 are mapped into the bottom row of the scheduling resource allocation tree 810 to obtain a set of nodes 825 as the scheduled nodes. The overlapping pattern 800 may enable full BW scheduling of the scheduled BWP. Accordingly, a UE may be enabled to fully utilize the scheduled BWP bandwidth for high peak data rate.

In some example embodiments, a part of the candidate nodes may be pruned to determine the scheduled resource. An example process will be discussed below with reference to FIG. 9.

Figure 9:
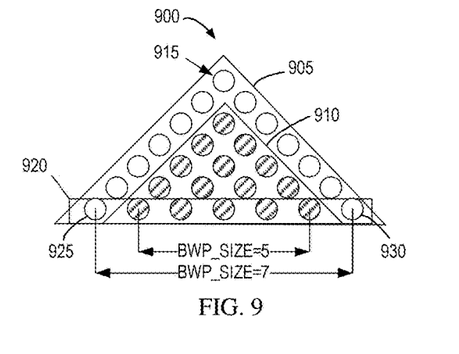

FIG. 9 shows an example overlapping pattern 900 of the resource allocation tree in accordance with some example embodiments of the present disclosure.

In this example, the reference size is greater than the size of the scheduled BWP, the nodes in a reference resource allocation tree 905 are on the outside of a scheduled resource allocation tree 910. As shown, the reference BWP size is 7 PRB and the scheduled BWP size is 5 PRB. A node 915 is selected based the RIV in the reference resource allocation tree 905. Further, all leaf nodes 920 are determined to be the candidate nodes. In this example, the terminal device 120 prunes out the nodes 925 and 930 in the reference resource allocation tree 905 to obtain the scheduled nodes.

In some example embodiments, the candidate nodes may include no scheduled nodes in the scheduled resource allocation tree. In this case, the first node may be mapped to a further node (referred to as a second node) in the scheduled resource allocation tree. Then, the terminal device 120 determines a set (referred to as "a second set") of leaf nodes of the second node in the scheduled resource allocation tree as the scheduled nodes. Some example processes will be described below with reference to FIG. 10.

Figure 10:
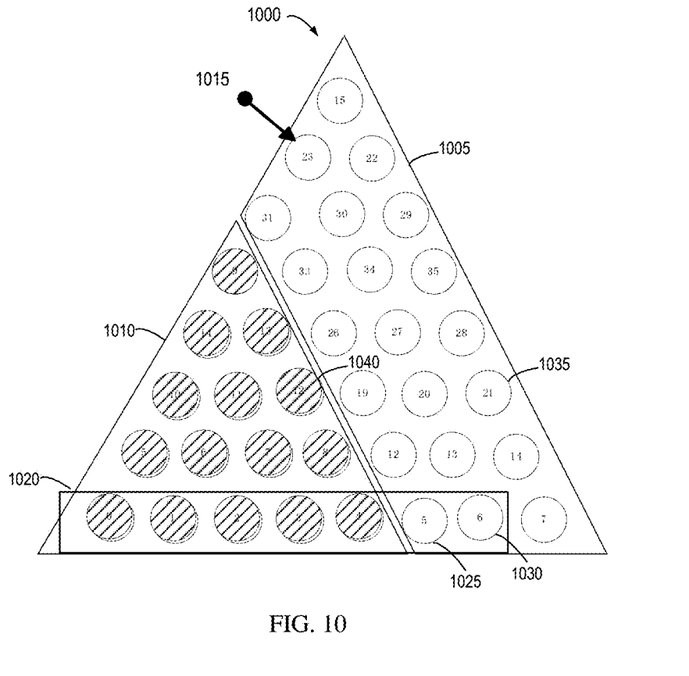

FIG. 10 shows an example overlapping pattern 1000 of the resource allocation tree in accordance with some example embodiments of the present disclosure.

In overlapping pattern 1000, the reference size is greater than the size of the scheduled BWP, the nodes in a reference resource allocation tree 1005 are on the right of a scheduled resource allocation tree 1010. As shown, if RIV=23 is indicated in the DCI, the terminal device 120 first finds a node 1015 according to the decoded RIV=23, and then terminal device 120 finds leaf nodes 1020 which cover PRB #0~#6. The terminal device 120 will further prune out the leaf nodes 1025 and 1030 and the remaining nodes (PRB #0~#4) are the assigned radio resource on the scheduled BWP.

For RIV=7, 14, 21, the corresponding leaf nodes are all related to the resource indication. In this situation, these RIV values may be avoided in the DCI. Alternatively, a special mapping rule may be defined for these special RIV values. For example, if the selected node cannot cover available resources in the scheduled BWP, this node will be mapped to another node. In the example as shown in FIG. 10, a node 1035 with RIV=21 does not cover available resources and will be shifted to a new node 1040 with RIV=12 in the same row in the scheduled resource allocation tree 1010. This RIV will be shifted to a new RIV (12) which covers PRB #2, #3, #4. Then, the terminal device 120 can identify the resource allocation on the scheduled BWP: PRB_Start=2, and PRB_N=4.

Using the resource allocation tree, the terminal device 120 only needs to perform one search of RIV value in the reference tree. Then, the resource allocation of scheduled BWP may be found which is very easy to implement.

In some example embodiments, the method 200 and the process 600 described above with reference to FIGS. 1-10 may be performed by an apparatus comprising means for performing the respective steps of the method 200 and the process 600. The means may be implemented in any suitable form. For example, the means may be implemented in a circuitry or software module.

Figure 11:
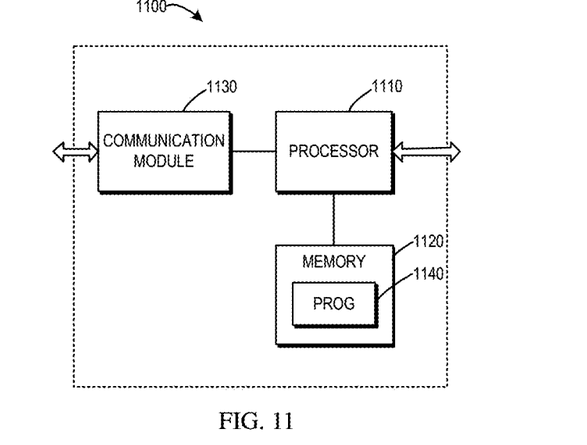
FIG. 11 illustrates a simplified block diagram of a device that is suitable for implementing example embodiments of the present disclosure.

FIG. 11 is a simplified block diagram of a device 1100 that is suitable for implementing example embodiments of the present disclosure. The device 1100 can be implemented at or as a part of the terminal device 120 as shown in FIG. 1.

As shown, the device 1100 includes a processor 1110, a memory 1120 coupled to the processor 1110, a communication module 1130 coupled to the processor 1110, and a communication interface (not shown) coupled to the communication module 1130. The memory 1120 stores at least a program 1140. The communication module 1130 is for bidirectional communications, for example, via multiple antennas. The communication interface may represent any interface that is necessary for communication.

The program 1140 is assumed to include program instructions that, when executed by the associated processor 1110, enable the device 1100 to operate in accordance with the example embodiments of the present disclosure, as discussed herein with reference to FIGS. 1-10. The example embodiments herein may be implemented by computer software executable by the processor 1110 of the device 1100, or by hardware, or by a combination of software and hardware. The processor 1110 may be configured to implement various example embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

When the device 1100 acts as the terminal device 120 or a part of the terminal device 120, the processor 1110 and the communication module 1130 may cooperate to implement the method 200 and the process 600 as described above with reference to FIGS. 1-10.

All operations and features as described above with reference to FIGS. 1-10 are likewise applicable to the device 1100 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 or the process 600 as described above with reference to FIGS. 1-10. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

Example 1. a device comprising: at least one processor; and at least one memory including computer program code; the at least one memory and the computer program code configured to, with the at least one processor, cause the device to: receive, by a terminal device in a Layer 1 signaling message, a resource indication to schedule resources on a plurality of bandwidth parts in a plurality of serving cells; determine a reference size of a reference bandwidth part; determine a reference resource based on the received resource indication and the reference size of the reference bandwidth part; determine alignment between the reference bandwidth part and a scheduled bandwidth part of the plurality of bandwidth parts; and determine, based on the reference resource and the alignment, a scheduled resource on the scheduled bandwidth part of the plurality of bandwidth parts.

Example 2. the device of example 1, wherein the reference size of the reference bandwidth part is preconfigured by a network device using a higher layer signaling message, or the reference size of the reference bandwidth part is dynamically configured by the network device using the higher layer signaling message for the scheduling.

Example 3. the device of example 1, wherein the device is caused to determine the reference resource by: scaling the reference size of the reference bandwidth part with a scaling factor; and determining the reference resource based on the received resource indication and the scaled reference size.

Example 4. the device of example 3, wherein the device is further caused to: receive, from the network device, an indication of the scaling factor in a higher layer signaling message.

Example 5. the device of example 3, wherein the scaling factor is configured by the network device for the scheduled bandwidth part.

Example 6. the device of example 3, wherein the device is further caused to: determine the scaling factor based on a reference size of the reference bandwidth part and a size of the scheduled bandwidth part.

Example 7. the device of any of examples 1-6, wherein the device is caused to determine the scheduled resource by: aligning an alignment point of the scheduled bandwidth part with an alignment point of the reference bandwidth part.

Example 8. the device of example 7, wherein the device is further caused to: receive, from the network device, an indication of at least one point as the alignment point of the reference bandwidth part in a higher layer signaling message.

Example 9. the device of example 7, wherein the at least one point is one of: a center physical resource block, a lowest physical resource block or a highest physical resource block of the reference bandwidth part.

Example 10. the device of example 7, wherein the device is caused to determine the scheduled resource by: after the aligning, determining the scheduled resource by truncating a part of the reference resource so that the scheduled resource is within the scheduled bandwidth part.

Example 11. the device of example 1, wherein the device is caused to determine the scheduled resource by: constructing a scheduled resource allocation tree and a reference resource allocation tree, wherein a plurality of nodes of the reference resource allocation tree are associated with a plurality of values of resource indications, and at least one node of the scheduled resource allocation tree is overlapping with at least one node of the reference resource allocation tree; selecting, in the reference resource allocation tree, a first node associated with a value of the received resource indication; determining a first set of leaf nodes of the first node in the reference resource allocation tree as a set of candidate nodes; and determining the scheduled resource based on the set of candidate nodes.

Example 12. the device of example 11, wherein the device is caused to construct the scheduled and reference resource allocation trees by: determining an overlapping pattern of the scheduled and reference resource allocation trees; and constructing the scheduled and reference resource allocation trees based on the overlapping pattern.

Example 13. the device of example 12, wherein the device is caused to determine the overlapping pattern by: selecting the overlapping pattern from a set of predefined overlapping patterns.

Example 14. the device of example 12, wherein the device is caused to determine the overlapping pattern by: receiving, from the network device, an indication of the overlapping pattern in a higher layer signaling message; and determining the overlapping pattern based on the indication.

Example 15. the device of example 11, wherein the nodes of the reference resource allocation tree are on the top, left or right or outside of the nodes of the scheduled resource allocation tree.

Example 16. the device of example 11, wherein the device is caused to determine the scheduled resources based on the set of candidate nodes by: determining a set of scheduled nodes based on the set of candidate nodes; and determining the scheduled resources based on the set of scheduled nodes.

Example 17. the device of example 16, wherein the nodes of the reference resource allocation tree are on the top of the nodes of the scheduled resource allocation tree, and the device is caused to determine the set of scheduled nodes based on the set of candidate nodes by: determining the set of scheduled nodes by mapping the set of candidate nodes into a bottom row of the scheduling resource allocation tree.

Example 18. the device of example 16, wherein the nodes of the reference resource allocation tree include a set of nodes in the bottom row of scheduled the resource allocation tree, and the device is caused to determine the set of scheduled nodes by: determining the set of scheduled nodes by pruning the set of nodes from the set of leaf nodes.

Example 19. the device of example 16, wherein the device is caused to determine the set of scheduled nodes based on the set of candidate nodes by: in response to the set of candidate nodes including no scheduled nodes in the scheduled resource allocation tree, selecting a second node associated with the first node in the scheduled resource allocation tree; and determining a second set of leaf nodes of the second node in the scheduled resource allocation tree as the set of scheduled nodes.

Example 20. a method comprising: receiving, by a terminal device in a Layer 1 signaling message, a resource indication to schedule resources on a plurality of bandwidth parts in a plurality of serving cells; determining a reference size of a reference bandwidth part; determining a reference resource based on the received resource indication and the reference size of the reference bandwidth part; determining alignment between the reference bandwidth part and a scheduled bandwidth part of the plurality of bandwidth parts; and determining, based on the reference resource and the alignment, a scheduled resource on the scheduled bandwidth part of the plurality of bandwidth parts.

Example 21. the method of example 20, wherein the reference size of the reference bandwidth part is preconfigured by a network device using a higher layer signaling message, or the reference size of the reference bandwidth part is dynamically configured by the network device using the higher layer signaling message for the scheduling.

Example 22. the method of example 20, wherein determining the reference resource comprising: scaling the reference size of the reference bandwidth part with a scaling factor; and determining the reference resource based on the received resource indication and the scaled reference size.

Example 23. the method of example 22, further comprising: receiving, from the network device, an indication of the scaling factor in a higher layer signaling message.

Example 24. the method of example 33, wherein the scaling factor is configured by the network device for the scheduled bandwidth part.

Example 25. the method of example 22, further comprising: determining the scaling factor based on a reference size of the reference bandwidth part and a size of the scheduled bandwidth part.

Example 26. the method of any of examples 20-25, wherein determining the scheduled resource comprises: aligning an alignment point of the scheduled bandwidth part with an alignment point of the reference bandwidth part.

Example 27. the method of example 26, further comprising: receiving, from the network device, an indication of at least one point as the alignment point of the reference bandwidth part in a higher layer signaling message.

Example 28. the method of example 26, wherein the at least one point is one of: a center physical resource block, a lowest physical resource block or a highest physical resource block of the reference bandwidth part.

Example 29. the method of example 26, wherein determining the scheduled resource comprises: after the aligning, determining the scheduled resource by truncating a part of the reference resource so that the scheduled resource is within the scheduled bandwidth part.

Example 30. the method of example 20, wherein determining the scheduled resource comprises: constructing a scheduled resource allocation tree and a reference resource allocation tree, wherein a plurality of nodes of the reference resource allocation tree are associated with a plurality of values of resource indications, and at least one node of the scheduled resource allocation tree is overlapping with at least one node of the reference resource allocation tree; selecting, in the reference resource allocation tree, a first node associated with a value of the received resource indication; determining a first set of leaf nodes of the first node in the reference resource allocation tree as a set of candidate nodes; and determining the scheduled resource based on the set of candidate nodes.

Example 31. the method of example 30, wherein constructing the scheduled and reference resource allocation trees comprising: determining an overlapping pattern of the scheduled and reference resource allocation trees; and constructing the scheduled and reference resource allocation trees based on the overlapping pattern.

Example 32. the method of example 31, wherein determining the overlapping pattern comprising: selecting the overlapping pattern from a set of predefined overlapping patterns.

Example 33. the method of example 31, wherein determining the overlapping pattern comprising: receiving, from the network device, an indication of the overlapping pattern in a higher layer signaling message; and determining the overlapping pattern based on the indication.

Example 34. the method of example 30, wherein the nodes of the reference resource allocation tree are on the top, left or right or outside of the nodes of the scheduled resource allocation tree.

Example 35. the method of example 30, wherein determining the scheduled resources based on the set of candidate nodes comprises: determining a set of scheduled nodes based on the set of candidate nodes; and determining the scheduled resources based on the set of scheduled nodes.

Example 36. the method of example 35, wherein the nodes of the reference resource allocation tree are on the top of the nodes of the scheduled resource allocation tree, and determining the set of scheduled nodes based on the set of candidate nodes comprises: determining the set of scheduled nodes by mapping the set of candidate nodes into a bottom row of the scheduling resource allocation tree.

Example 37. the method of example 35, wherein the nodes of the reference resource allocation tree include a set of nodes in the bottom row of scheduled the resource allocation tree, and determining the set of scheduled nodes based on the set of candidate nodes comprises: determining the set of scheduled nodes by mapping the set of candidate nodes into a bottom row of the scheduling resource allocation tree.

Example 38. the method of example 35, wherein determining the set of scheduled nodes based on the set of candidate nodes comprises: in response to the set of candidate nodes including no scheduled nodes in the scheduled resource allocation tree, selecting a second node associated with the first node in the scheduled resource allocation tree; and determining a second set of leaf nodes of the second node in the scheduled resource allocation tree as the set of scheduled nodes.

Example 39. an apparatus comprising: means for receiving, by a terminal device in a Layer 1 signaling message, a resource indication to schedule resources on a plurality of bandwidth parts in a plurality of serving cells; means for determining a reference size of a reference bandwidth part; means for determining a reference resource based on the received resource indication and the reference size of the reference bandwidth part; means for determining alignment between the reference bandwidth part and a scheduled bandwidth part of the plurality of bandwidth parts; and means for determining, based on the reference resource and the alignment, a scheduled resource on the scheduled bandwidth part of the plurality of bandwidth parts.

Example 40. the method of example 39, wherein the reference size of the reference bandwidth part is preconfigured by a network device using a higher layer signaling message, or the reference size of the reference bandwidth part is dynamically configured by the network device using the higher layer signaling message for the scheduling.

Example 41. the apparatus of example 39, wherein the means for determining the reference resource comprising: means for scaling the reference size of the reference bandwidth part with a scaling factor; and means for determining the reference resource based on the received resource indication and the scaled reference size.

Example 42. the apparatus of example 41, further comprising: means for receiving, from the network device, an indication of the scaling factor in a higher layer signaling message.

Example 43. the apparatus of example 41, wherein the scaling factor is configured by the network device for the scheduled bandwidth part.

Example 44. the apparatus of example 41, further comprising: means for determining the scaling factor based on a reference size of the reference bandwidth part and a size of the scheduled bandwidth part.

Example 45. the apparatus of any of examples 39-44, wherein the means for determining the scheduled resource comprises: means for aligning an alignment point of the scheduled bandwidth part with an alignment point of the reference bandwidth part.

Example 46. the apparatus of example 45, further comprising: means for receiving, from the network device, an indication of at least one point as the alignment point of the reference bandwidth part in a higher layer signaling message.

Example 47. the apparatus of example 45, wherein the at least one point is one of: a center physical resource block, a lowest physical resource block or a highest physical resource block of the reference bandwidth part.

Example 48. the apparatus of example 45, wherein the means for determining the scheduled resource comprises: means for after the aligning, determining the scheduled resource by truncating a part of the reference resource so that the scheduled resource is within the scheduled bandwidth part.

Example 49. the apparatus of example 39, wherein the means for determining the scheduled resource comprises: means for constructing a scheduled resource allocation tree and a reference resource allocation tree, wherein a plurality of nodes of the reference resource allocation tree are associated with a plurality of values of resource indications, and at least one node of the scheduled resource allocation tree is overlapping with at least one node of the reference resource allocation tree; means for selecting, in the reference resource allocation tree, a first node associated with a value of the received resource indication; means for determining a first set of leaf nodes of the first node in the reference resource allocation tree as a set of candidate nodes; and means for determining the scheduled resource based on the set of candidate nodes.

Example 50. the apparatus of example 49, wherein the means for constructing the scheduled and reference resource allocation trees comprising: means for determining an overlapping pattern of the scheduled and reference resource allocation trees; and means for constructing the scheduled and reference resource allocation trees based on the overlapping pattern.

Example 51. the apparatus of example 50, wherein the means for determining the overlapping pattern comprising: means for selecting the overlapping pattern from a set of predefined overlapping patterns.

Example 52. the apparatus of example 50, wherein the means for determining the overlapping pattern comprising: means for receiving, from the network device, an indication of the overlapping pattern in a higher layer signaling message; and; and means for determining the overlapping pattern based on the indication.

Example 53. the apparatus of example 49, wherein the nodes of the reference resource allocation tree are on the top, left or right or outside of the nodes of the scheduled resource allocation tree.

Example 54. the apparatus of example 49, wherein the means for determining the scheduled resources based on the set of candidate nodes comprises: means for determining a set of scheduled nodes based on the set of candidate nodes; and means for determining the scheduled resources based on the set of scheduled nodes.

Example 55. the apparatus of example 54, wherein the nodes of the reference resource allocation tree are on the top of the nodes of the scheduled resource allocation tree, and means for determining the set of scheduled nodes based on the set of candidate nodes comprises: means for determining the set of scheduled nodes by mapping the set of candidate nodes into a bottom row of the scheduling resource allocation tree.

Example 56. the apparatus of example 54, wherein the nodes of the reference resource allocation tree include a set of nodes in the bottom row of scheduled the resource allocation tree, and the means for the set of scheduled nodes based on the set of candidate nodes comprises: means for determining the set of scheduled nodes by mapping the set of candidate nodes into a bottom row of the scheduling resource allocation tree.

Example 57. the apparatus of example 54, wherein the means for determining the set of scheduled nodes based on the set of candidate nodes comprises: means for in response to the set of candidate nodes including no scheduled nodes in the scheduled resource allocation tree, selecting a second node associated with the first node in the scheduled resource allocation tree; and means for determining a second set of leaf nodes of the second node in the scheduled resource allocation tree as the set of scheduled node.

Example 58. a computer readable storage medium comprising program instructions stored thereon, the instructions, when executed by a processor of a device, causing the device to perform the method of any of examples 20-38.

What is claimed is:

1. A device comprising:
at least one processor; and
at least one memory including computer program code;
the at least one memory and the computer program code configured to, with the at least one processor, cause the device to,
receive, by a terminal device in a Layer 1 signaling message, a resource indication to schedule resources on a plurality of bandwidth parts in a plurality of serving cells;
determine a reference size of a reference bandwidth part;
determine a reference resource based on the received resource indication and the reference size of the reference bandwidth part;
determine alignment between the reference bandwidth part and a scheduled bandwidth part of the plurality of bandwidth parts; and
determine, based on the reference resource and the alignment, a scheduled resource on the scheduled bandwidth part of the plurality of bandwidth parts.

2. The device of claim 1, wherein
the reference size of the reference bandwidth part is preconfigured by a network device using a higher layer signaling message, or
the reference size of the reference bandwidth part is dynamically configured by the network device using the higher layer signaling message for the scheduling.

3. The device of claim 1, wherein the device is caused to determine the reference resource by:
scaling the reference size of the reference bandwidth part with a scaling factor; and
determining the reference resource based on the received resource indication and the scaled reference size.

4. The device of claim 3, wherein the device is further caused to:
receive, from the network device, an indication of the scaling factor in a higher layer signaling message.

5. The device of claim 3, wherein the scaling factor is configured by the network device for the scheduled bandwidth part.

6. The device of claim 3, wherein the device is further caused to:
determine the scaling factor based on a reference size of the reference bandwidth part and a size of the scheduled bandwidth part.

7. The device of claim 1, wherein the device is caused to determine the alignment:
by aligning an alignment point of the scheduled bandwidth part with an alignment point of the reference bandwidth part.

8. The device of claim 7, wherein the device is further caused to:
receive, from the network device, an indication of at least one point as the alignment point of the reference bandwidth part in a higher layer signaling message.

9. The device of claim 8, wherein the at least one point is one of a center physical resource block, a lowest physical resource block or a highest physical resource block of the reference bandwidth part.

10. The device of claim 7, wherein the device is caused to determine the scheduled resource by:
after the aligning, determining the scheduled resource by truncating a part of the reference resource so that the scheduled resource is within the scheduled bandwidth part.

11. The device of claim 1, wherein the device is caused to determine the scheduled resource by:
constructing a scheduled resource allocation tree and a reference resource allocation tree, wherein a plurality of nodes of the reference resource allocation tree are associated with a plurality of values of resource indications, and at least one node of the scheduled resource allocation tree is overlapping with at least one node of the reference resource allocation tree;
selecting, in the reference resource allocation tree, a first node associated with a value of the received resource indication;
determining a first set of leaf nodes of the first node in the reference resource allocation tree as a set of candidate nodes; and
determining the scheduled resource based on the set of candidate nodes.

12. The device of claim 11, wherein the device is caused to construct the scheduled and reference resource allocation trees by:
determining an overlapping pattern of the scheduled and reference resource allocation trees; and
constructing the scheduled and reference resource allocation trees based on the overlapping pattern.

13. The device of claim 12, wherein the device is caused to determine the overlapping pattern by:
selecting the overlapping pattern from a set of predefined overlapping patterns.

14. The device of claim 12, wherein the device is caused to determine the overlapping pattern by:
receiving, from the network device, an indication of the overlapping pattern in a higher layer signaling message; and determining the overlapping pattern based on the indication of the overlapping pattern.

15. The device of claim 11, wherein
the nodes of the reference resource allocation tree are on the top, left or right or outside of the nodes of the scheduled resource allocation tree.

16. The device of claim 11, wherein the device is caused to determine the scheduled resources based on the set of candidate nodes by:
determining a set of scheduled nodes based on the set of candidate nodes; and
determining the scheduled resources based on the set of scheduled nodes.

17. The device of claim 16, wherein the nodes of the reference resource allocation tree are on the top of the nodes of the scheduled resource allocation tree, and the device is caused to determine the set of scheduled nodes based on the set of candidate nodes by:
determining the set of scheduled nodes by mapping the set of candidate nodes into a bottom row of the scheduling resource allocation tree.

18. The device of claim 16, wherein the nodes of the reference resource allocation tree include a set of nodes in the bottom row of scheduled the resource allocation tree, and the device is caused to determine the set of scheduled nodes by:
determining the set of scheduled nodes by pruning the set of nodes from the set of leaf nodes.

19. The device of claim 16, wherein the device is caused to determine the set of scheduled nodes based on the set of candidate nodes by:
in response to the set of candidate nodes including no scheduled nodes in the scheduled resource allocation tree, selecting a second node associated with the first node in the scheduled resource allocation tree; and
determining a second set of leaf nodes of the second node in the scheduled resource allocation tree as the set of scheduled nodes.

20. A non-transitory computer readable storage medium storing program instructions, which when executed by a processor of a device, cause the device to perform
receiving, by the device Layer 1 signaling message, a resource indication to schedule resources on a plurality of bandwidth parts in a plurality of serving cells;
determining a reference size of a reference bandwidth part;
determining a reference resource based on the received resource indication and the reference size of the reference bandwidth part;
determining alignment between the reference bandwidth part and a scheduled bandwidth part of the plurality of bandwidth parts; and
determining, based on the reference resource and the alignment, a scheduled resource on the scheduled bandwidth part of the plurality of bandwidth parts.

* * * * *

UNITED STATES PATENT AND TRADEMARK OFFICE
CERTIFICATE OF CORRECTION

| | | |
|---|---|---|
| PATENT NO. | : 11,968,657 B2 | Page 1 of 1 |
| APPLICATION NO. | : 17/422992 | |
| DATED | : April 23, 2024 | |
| INVENTOR(S) | : Tao Yang et al. | |

It is certified that error appears in the above-identified patent and that said Letters Patent is hereby corrected as shown below:

In the Claims

Claim 20 Should read:
20. A non-transitory computer readable storage medium storing program instructions, which when executed by a processor of a device, cause the device to perform receiving, by the device in a Layer 1 signaling message, a resource indication to schedule resources on a plurality of bandwidth parts in a plurality of serving cells; determining a reference size of a reference bandwidth part; determining a reference resource based on the received resource indication and the reference size of the reference bandwidth part; determining alignment between the reference bandwidth part and a scheduled bandwidth part of the plurality of bandwidth parts; and determining, based on the reference resource and the alignment, a scheduled resource on the scheduled bandwidth part of the plurality of bandwidth parts.

Signed and Sealed this
Twenty-eighth Day of May, 2024

Katherine Kelly Vidal
*Director of the United States Patent and Trademark Office*